United States Patent Office 3,574,101
Patented Apr. 6, 1971

3,574,101
ACYLATING AGENTS, THEIR SALTS, AND
LUBRICANTS AND FUELS CONTAINING
THE SAME
John P. Murphy, Willoughby, Ohio, assignor to The
Lubrizol Corporation, Wickliffe, Ohio
No Drawing. Filed Apr. 29, 1968, Ser. No. 725,189
Int. Cl. C10m 1/40
U.S. Cl. 252—33                                 16 Claims

ABSTRACT OF THE DISCLOSURE

Oil-soluble carboxylic acid acylating agents are prepared by reacting a high molecular weight mono- or polycarboxylic acid with a sulfonating agent. The resulting acylating agents can be converted to acidic, neutral, or basic metal salts. Both the novel acylating agents and the salts are useful additives for lubricants and fuels and as intermediates for the preparation of other useful lubricant and fuel additives, particularly high molecular weight oil-soluble acylated nitrogen compositions and esters. The latter are prepared by reacting the acylating agents with, for example, alkylene polyamines or mono- or polyhydric alcohols.

---

This invention relates to high molecular weight carboxylic acid acylating agents useful as additives in lubricants and fuels and as intermediates in the preparation of other useful compositions. In particular, the invention relates to oil-soluble, high molecular weight, mono- and polycarboxylic acid acylating agents produced by reacting a carboxylic acid or an acylating derivative thereof with a sulfonating agent, the salts of these acylating agents, and to lubricants and fuels containing the acylating agents or their salts.

As well-known, high molecular weight carboxylic acid acylating agents containing at least about thirty and, preferably at least about fifty, aliphatic carbon atoms are used as additives for lubricant and fuel compositions, and as intermediates for the preparation of other products which are also useful as additives in lubricants and fuels. For example, U.S. Pats. 3,163,603; 3,219,666; 3,240,575; 3,271,310; and 3,272,746 disclose useful sludge-dispersing materials prepared by reacting these acids with various amines, metal compounds, or combinations of amines and metal compounds; 3,288,714 discloses the use of a high molecular weight carboxylic acid anhydride as a lubricant additive; 3,331,776 discloses esters prepared from such acids as additives for lubricants; and 3,346,354 discloses such acids, their anhydrides, and the esters thereof as fuel additives.

While the high molecular weight carboxylic acid acylating agents of the present invention can be used for the same purposes as these prior-art carboxylic acid acylating agents, they are particularly useful in the preparation of metal salts which function as detergents and rust inhibitors in lubricants and fuels. The acylating agents and salts of this invention are described in more detail hereinbelow.

In accordance with the foregoing, it is a principal object of this invention to provide novel, high molecular weight, oil-soluble carboxylic acid acylating agents.

Another object of this invention is to provide novel, salts of high-molecular weight carboxylic acids.

A further object is to provide lubricant and fuel compositions containing the acylating agents of this invention.

A still further object is to provide lubricant and fuel compositions containing the salts.

These and other objects of this invention are achieved by providing oil-soluble carboxylic acid acylating agents which are reaction products produced by the process comprising reacting (A) at least one oil-soluble high molecular weight mono- or polycarboxylic acid acylating agent characterized by the presence within its structure of at least about thirty aliphatic carbon atoms exclusive of carboxyl carbon atoms with (B) at least one sulfonating agent, the amounts of (A) and (B) employed being such that there is at least one mole of (B) for each mole of (A) in the reaction mixture, and the corresponding acidic, neutral or basic salts of the acylating agents. The lubricant and fuel compositions contemplated are those which contain the novel acylating agents and metal salts of this invention.

As mentioned above, the carboxylic acid acylating agents used as intermediates in the preparation of the acylating agents of this invention are well known in the art. One important aspect of these intermediates is that they should be substantially saturated, i.e., at least about 95% of the total number of the carbon-to-carbon covalent linkages therein preferably should be saturated linkages. In an especially preferred aspect of the invention, at least about 98% of these covalent linkages are saturated. Obviously, all of the covalent linkages may be saturated. A greater degree of unsaturation renders the acylating agents more susceptible to oxidation, degradation, and polymerization and this lessens the effectiveness of the final products as lubricant and fuel additives.

In addition, the intermediate acylating agents should be substantially free from oil-solubilizing pendant groups, that is, groups having more than about six aliphatic carbon atoms. Although, some such oil-solubilizing pendant groups may be present, they preferably will not exceed one such group for every twenty-five aliphatic carbon atoms in the principal hydrocarbon chain of the acylating agent.

The intermediates may contain polar substituents provided that the polar substituents are not present in proportions sufficiently large to alter significantly the hydrocarbon character of the radical. Illustrative polar substituents are halo, such as chloro and bromo, oxo, oxy, formyl, sulfonyl sulfinyl, thio, nitro, etc. These polar substituents, if present, preferably will not exceed 10% by weight of the total weight of the hydrocarbon portion of the carboxylic acid radical exclusive of the carboxyl group.

Carboxylic acid acylating agents suitable as intermediates for preparing the acylating agents of this invention are well-known in the art and have been described in detail, for example, in U.S. Pats. 3,087,936; 3,163,603; 3,172,892; 3,189,544; 3,219,666; 3,272,746; 3,288,714; 3,306,907; 3,331,776; 3,340,281; 3,341,542; and 3,346,354. In the interest of brevity, these patents are incorporated herein for their disclosure of these mono- and polycarboxylic acid acylating agents.

As disclosed in the foregoing patents, there are several processes for preparing the acylating agents used as starting materials. Generally, the process involves the reaction of (1) an ethylenically unsaturated carboxylic acid, acid halide, or anhydride with (2) an ethylenically unsaturated hydrocarbon containing at least about fifty aliphatic carbon atoms or a chlorinated hydrocarbon containing at least about fifty aliphatic carbon atoms at a temperature within the range of about 100°–300° C. The chlorinated hydrocarbon or ethylenically unsaturated hydrocarbon reactant can, of course, contain polar substitutents, oil-solubilizing pendant groups, and be unsaturated within the general limitations explained hereinabove.

When preparing the carboxylic acid acylating agent according to one of these two processes, the carboxylic acid reactant usually corresponds to the formula $R_o$—$(COOH)_n$, where $R_o$ is characterized by the presence of at least one ethylenically unsaturated carbon-to-carbon covalent bond and $n$ is an integer from one to six and preferably one or two. The acidic reactant can also be the corresponding carboxylic acid halide, anhydride, ester, or other equivalent acylating agent and mixtures of one or more of these. Ordinarily, the total number of carbon atoms in the acidic reactant will not exceed ten and generally will not exceed six. Preferably the acidic reactant will have at least one ethylenic linkage in an $\alpha,\beta$-position with respect to at least one carboxylic function. Exemplary acidic reactants are acrylic acid, methacrylic acid, maleic acid, maleic anhydride, fumaric acid, itaconic acid, itaconic anhydride, citraconic acid, citraconic anhydride, mesaconic acid, glutaconic acid, chloromaleic acid, aconitic acid, crotonic acid, methylcrotonic acid, sorbic acid, 3-hexenoic acid, 10-decenoic acid, and the like. Due to considerations of economy and availability, these acid reactants usually employed are acrylic acid, methacrylic acid, maleic acid, and maleic anhydride.

As is apparent from the foregoing discussion, the carboxylic acid acylating agents used as starting materials may contain cyclic and/or aromatic groups. However, the acids are substantially aliphatic in nature and, in most instances, the preferred acid acylating agents are aliphatic, especially aliphatic mono- and polycarboxylic acids, anhydrides, and halides.

The substantially saturated aliphatic hydrocarbon-substituted succinic acid and anhydrides are particularly preferred as acylating agents for use in the preparation of the novel acylating agents of the present invention. These succinic acid acylating agents are readily prepared by reacting maleic anhydride with a high molecular weight olefin or a chlorinated hydrocarbon such as a chlorinated polyolefin. The reaction involves merely heating the two reactants at a temperature of about 100°–300° C., preferably, 100°–200° C. The product from such a reaction is a substituted succinic anhydride where the substituent is derived from the olefin or chlorinated hydrocarbon as described in the above cited patents. The product may be hydrogenated to remove all or a portion of any ethylenically unsaturated covalent linkages by standard hydrogenation procedures, if desired. The substituted succinic anhydrides may be hydrolyzed by treatment with water or steam to the corresponding acid and either the anhydride or the acid may be converted to the corresponding acid halide or ester by reacting with phosphorus halide, phenols, or alcohols.

The ethylenically unsaturated hydrocarbon reactant and the chlorinating hydrocarbon reactant used in the preparation of the acylating agents are principally the high molecular weight, substantially saturated petroleum fractions and substantially saturated olefin polymers and the corresponding chlorinated products. The polymers and chlorinated polymers derived from mono-olefins having from two to about thirty carbon atoms are preferred. The especially useful polymers are the polymers of 1-mono-olefins such as ethylene, propene, 1-butene, isobutene, 1-hexene, 1-octent, 2-methyl-1-heptent, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene.

The interpolymers of 1-mono-olefins such illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with- piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

For reasons of oil-solubility and stability, the interpolymers contemplated for use in preparing the acylating agents of this invention should be substantially aliphatic and substantially saturated, that is, they should contain at least about 80% and preferably about 95%, on a weight basis, of units derived from aliphatic mono-olefins. Preferably, they will contain no more than about 5% olefinic linkages based on the total number of the carbon-to-carbon covalent linkages present.

The chlorinated hydrocarbons and ethylenically unsaturated hydrocarbons used in the preparation of the acylating agents can have molecular weights of from about 700 up to about 100,000 or even higher. The preferred reactants are the above described polyolefins and chlorinated polyolefins having an average molecular weight of about 700 to about 5,000. When the acylating agent has a molecular weight in excess of about 10,000, the acylating agent also possess viscosity index improving qualities.

In lieu of the high molecular weight hydrocarbons and chlorinated hydrocarbons discussed above, hydrocarbons containing activating polar substitutents which are capable of activating the hydrocarbon molecule in respect to reaction with an ethylenically unsaturated acid reactant may be used in the above-illustrated reactions for preparing the acylating agents. Such polar substituents include sulfide and disulfide linkages, and nitro, mercapto, carbonyl, and formyl radicals. Examples of these polar-substituted hydrocarbons include polypropene sulfide, di-polyisobutene disulfide, nitrated mineral oil, di-polyethylene sulfide, brominated polyethylene, etc.

The intermediate acylating agents may also be prepared by halogenating a high molecular weight hydrocarbon such as the above described olefin polymers to produce a poly-halogenating product, converting the poly-halogenated product to a poly-nitrile, and then hydrolyzing the poly-nitrile. They may be prepared by oxidation of a high molecular weight polyhydric alcohol with potassium permanganate, nitric acid, or a similar oxidizing agent. Another method for preparing such poly-carboxylic acids involves the reaction of an olefin or a polar-substituted hydrocarbon such as a chloropolyisobutene with an unsaturated polycarboxylic acid such as 2-pentene-1, 3,5-tricarboxylic acid prepared by dehydration of citric acid. Monocarboxylic acid acylating agents may be obtained by oxidizing a monoalcohol with potassium permanganate or by reacting a halogenated high molecular weight olefin polymer with a ketene. Another convenient method for preparing monocarboxylic acid involves the reaction of metallic sodium with an acetoacetic ester or a malonic ester of an alkanol to form a sodium derivative of the ester and the subsequent reaction of the sodium derivative with a halogenated high molecular weight hydrocarbon such as brominated wax or brominated polyisobutene.

Mono-carboxylic and poly-carboxylic acid intermediates can also be obtained by reacting chlorinated mono- and polycarboxylic acids, anhydrides, acyl halides, and the like with ethylenically unsaturated hydrocarbons or ethylenically unsaturated substituted hydrocarbons such as the polyolefins and substituted polyolefins described hereinbefore in the manner described in 3,340,281.

The mono-carboxylic and poly-carboxylic acid anhydrides are obtained by dehydrating the corresponding acids. Dehydration is readily accomplished by heating the acid to a temperature above about 70° C., preferably in the presence of a dehydration agent, e.g. acetic anhydride. Cyclic anhydrides are usually obtained from poly-carboxylic acids having acid radicals separated by no more than three carbon atoms such as substituted succinic or glutaric acid, whereas linear anhydrides are obtained from poly-carboxylic acids having the acid radicals separated by four or more carbon atoms. The acid halides of the mono-carboxylic and polycarboxylic acids can be prepared by the reaction of the acids or their anhydrides with a halogenating agent such as phosphorus tribromide, phosphorus pentachloride, or thionyl chloride.

The acylating agent of this invention can be prepared by reacting at least one high molecular weight carboxylic acid acylating agent of the type described more fully hereinabove with a suitable sulfonating agent such as sulfur trioxide, sulfuric acid, a combination of sulfuric acid and thionyl chloride, a halosulfonic acid, and the like under conventional sulfonation conditions. These and other sulfonating agents are well-known in the art and the conditions under which they may be employed are also known. For example, these sulfonating agents and conditions for their employment are discussed in detail in E. E. Gilbert, Sulfonation and Related Reactions, published by Interscience Publishers, a division of John Wiley and Sons, Inc., New York (1965). For the sake of brevity, this text is incorporated herein by reference for its disclosure of sulfonating agents and conditions.

The preferred sulfonating agents are the halosulfonic acids of the formula

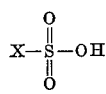

where X is F or Cl. The most preferred sulfonating agent is chlorosulfonic acid.

The reaction between the carboxylic acid acylating agent used as a starting material and the halosulfonic acid can be conducted over a wide temperature range, for example, from about 0° C. to about 200° C. However, the reaction proceeds readily at temperatures of about 25°–150° C. Temperatures of about 40°–90° C. have been found to produce excellent results in most cases and, for that reason, are preferred. The reaction is generally conducted in the presence of one or more inert organic liquid diluents such as mineral oil, naphthas, ethers, the liquid hydrocarbons such as pentane, hexane, heptane, cyclohexane, benzene, toluene, xylene, and the corresponding chlorinated hydrocarbons.

The precise nature of the reaction products is not known. It is believed that the sulfonating agents react with the acylating agents to form sulfo substituents

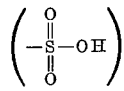

on the carboxylic acid acylating agent. For example, if the carboxylic acid acylating agent used as a starting material is a polyisobutenyl-substituted succinic anhydride, reaction with a sulfonating agent is believed to produce sulfo groups on the polyisobutenyl substituent. However, it is also possible that other products are produced. For example, when a halosulfonic acid is employed, the reaction can result in substituents such as sulfonyl halides

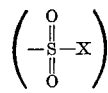

or a halosulfate substituent

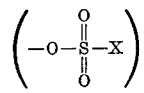

Moreover, when the carboxylic acid acylating agent used as the starting material is a carboxylic acid anhydride, it is possible that some halosulfonic acid can react to form a carboxylic-sulfuric acid anhydride, particularly at lower reaction temperatures, e.g. ≦0° C.:

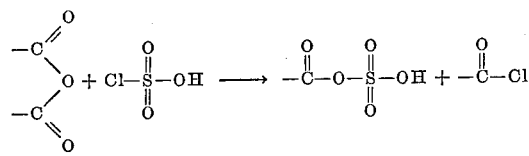

Accordingly, the products of this invention are best described in terms of the process by which they are produced. It is possible that the reaction product is, in fact, a mixture of such carboxylic acid acylating agents.

Usually at least about one mole of the sulfonating agent is employed in the reaction mixture for each mole of high molecular weight carboxylic acid acylating agents used as a starting material. Of course, greater amounts of sulfonating agent can be used and, in most instances, at least a slight molar excess of the sulfonating agent is desirable. However, for best results, there normally should not be more than one mole of sulfonating agent for each 25 aliphatic carbon atoms per mole of carboxylic acid acylating agent. Accordingly, the molar ratio of sulfonating agent to carboxylic acid acylating agent should be such that not more than about one mole of sulfonating agent combines with the carboxylic acid acylating agent per 25 aliphatic carbon atoms in the latter.

The following examples further illustrate the present invention. As used in these examples and elsewhere in the specification and claims, the terminology "percent" and "parts" is intended to designate percent by weight and parts by weight, respectively, unless otherwise indicated.

Example 1 briefly describes the preparation of suitable carboxylic acid acylating agents suitable as starting materials. The acylating agents are produced according to known procedures as described above.

EXAMPLE 1

(A) A polyisobutenyl succinic anhydride having an acid number of 105 and an equivalent weight of 540 is prepared by the reaction of a chlorinated polyisobutylene having an average molecular weight of 1050 and a chlorine content of 4.3% with maleic anhydride at 200° C.

(B) A polypropenyl-substituted anhydride is prepared by the reaction of a chlorinated polypropylene having a molecular weight of about 900 and a chlorine content of about 4% with maleic anhydride at 200° C. The product has an acid number of 75.

(C) A substituted succinic anhydride is prepared by reacting a maleic anhydride with a chlorinated copolymer of isobutylene and styrene. The copolymer consists of 94 parts of isobutylene units, 6 parts of styrene units, has an average molecular weight of 1200, and a chlorine content of 2.8% by weight. The resulting substituted succinic anhydride has an acid number of 40.

(D) A substituted succinic anhydride is prepared by treating maleic anhydride with a chlorinated copolymer of isobutylene and isoprene. The copolymer consists of 99 parts of isobutylene units and one part of isoprene units. The copolymer has a molecular weight of 28,000 and a chlorine content of 1.95%. The resulting alkenyl-succinic anhydride has a acid number of 54.

(E) A polyisobutenyl-substituted succinic anhydride is prepared by reaction of a chlorinated polyisobutylene with maleic anhydride. The chlorinated polyisobutylene has a chlorine content of 2% and an average molecular weight of 11,000. The polyisobutenyl-substtiuted succinic anhydride thus produced has an acid number of 48.

(F) A methyl ester of a high molecular weight monocarboxylic acid is prepared by heating an equi-molar mixture of a chlorinated polyisobutene having a molecular weight of 1000 and a chlorine content of 4.7% with methyl methacrylate at 150°–220° C.

(G) A substituted mono-carboxylic acid acylating agent is obtained by reacting at 150°–200° C. an equi-molar amount of acrylic acid and a chlorinated polyisobutene having a chlorine content of about 4.5% and a molecular weight of about 850.

(H) A polyisobutene having a molecular weight of 1000 and maleic anhydride is heated at 150°–220° C. to form a polyisobutenyl-substituted succinic anhydride.

(I) A reaction mixture comprising 0.75 mole of polyisobutene having an average molecular weight of 1200 and 2.25 moles of chloroacetyl chloride is refluxed in the presence of di-t-butyl peroxide according to the procedure described in U.S. Pat. 3,340,281 to produce a high molecular weight carboxylic acid chloride.

EXAMPLE 2

(A) A mixture of 1000 parts of mineral oil and 1650 parts of polyisobutenyl-substituted succinic anhydride (average molecular weight–825) prepared according to the procedure of Example 1(A) is heated to about 65° C. Then 233 parts of chlorosulfonic acid are added over 1.5 hours while maintaining the temperature at 65°–75° C. The reaction mixture is then blown with ntirogen for 2.5 hours while maintaining the temperature at about 70° C. The resulting reaction mixture is an oil solution of the desired reaction product. This solution is characterized by its sulfur content of 1.46%.

(B) A mixture comprising 1046 parts of polyisobutenyl-substituted succinic anhydride (average molecular weight–1046) prepared according to the procedure of Example 1(A) and 1046 parts of mineral oil is heated to about 40° C. Thereafter, 128 parts of chlorosulfonic acid are added to this mixture dropwise over a period of two hours while maintaining the temperature of the mass at 40°–50° C. The resulting reaction mixture is then heated an additional two hours while maintaining a temperature of 40°–50° C. during which time it is blown with nitrogen. Subsequently, 6% of Super Filtrol (a commercially available acidified clay used as a filter aid and sold by Filtrol Corp.) is added and mixed for one hour and the entire mass filtered. The filtrate is an oil solution of the desired reaction product and is characterized by a sulfur content of 0.62%.

(C) A reaction mixture comprising 2112 parts of polyisobutenyl-substituted succinic anhydride (average molecular weight–1056) prepared according to the procedure of 1(A) and 570 parts of mineral oil is heated to 80°–90° C. While maintaining this mixture at that temperature, 233 parts of chlorosulfonic acid are added dropwise over twelve hours. Thereafter, the reaction mixture is maintained at this temperature for an additional two hours, the last hour of which the material is blown with nitrogen. A commercial filter aid is added and the reaction mass filtered. The filtrate is an oil solution of the desired reaction product and is characterized by a sulfur content of 0.65%.

(D) 1036 parts of polyisobutenyl-substituted succinic anhydride (average molecular weight–1036) prepared according to the procedure of Example 1(A) is heated to about 70°–75° C. Thereafter, 245 parts of chlorosulfonic acid are added followed by 200 parts of mineral oil and 600 parts of n-hexane during which time the temperature was lowered to 50° C. Thereafter, this mixture is refluxed at 50° C. for three hours and then blown with nitrogen for four hours at a temperature of 50°–60° C. to remove the hexane. The reaction mass is then filtered. The filtrate is an oil solution of the desired reaction product and is characterized by its sulphur content of 2.9%.

(E) Six hundred and forty-five parts of polyisobutenyl-substituted succinic anhydride (average molecular weight–1300) prepared according to the procdure of Example 1(H) and 645 parts of dichloroethylene are mixed at 21° C. and thereafter 122.5 parts of chlorosulfonic acid are added during which time the temperature is maintained at 30°–34° C. This mixture is maintained at 30°–40° C. for four hours while blowing with nitrogen. The material is stripped by heating to 68° C. at a pressure of 10 mm. (Hg) and thereafter filtered. The filtrate is an oil solution of the desired reaction product and is characterized by a sulfur content of 1.6%.

The following general procedures utilized in Example 2, additional reaction products contemplated by the present invention are prepared by using the carboxylic acid acylating agent and sulfonating agent indicated in the following table in the indicated amount.

TABLE I.—REACTANTS

| Example No. | Carboxylic acid acylating agent (A) | Sulfonating agent (S) | Molar ratio (A):(S) |
|---|---|---|---|
| 3 | Anhydride of Example 1(C) | ClSO$_3$H | 1:1.1 |
| 4 | Anhydride of Example 1(B) | FSO$_3$H | 1:1.05 |
| 5 | Ester of Example 1(F) | ClSO$_3$H | 1:1.1 |
| 6 | Anhydride of Example 1(H) | ClSO$_3$H | 1:1.25 |
| 7 | Acyl chloride of Example 1(I) | ClSO$_3$H | 1:1.3 |
| 8 | do | ClSO$_3$H | 1:1.75 |
| 9 | Anhydride of Example 1(E) | ClSO$_3$H | 1:3.5 |
| 10 | do | FSO$_3$H | 1:6 |

EXAMPLE 11

(A) 1056 parts of polyisobutenyl-substituted succinic anhydride (average molecular weight–1056) prepared according to the procedure of Example 1(A) and 1056 parts of mineral oil are heated to 60° C. Thereafter, while maintaining a temperature of 60°–75° C., 122 parts of chlorosulfonic acid is added over a two-hour period. The reaction mixture is then blown with nitrogen for one hour while maintaining a temperature at 70° C. The resulting mixture is an oil solution of the desired reaction product.

(B) The use of the reaction products of this invention as acylating agent intermediates for the preparation of nitrogen-containing sludge dispersants for lubricating oil compositions is illustrated as follows: A mixture comprising 907 parts of the above oil solution, 42 parts of Polyamine H (an ethylene-amine mixture having an average composition corresponding to that of tetraethylene pentamine and available from carbide and carbon) and 150 parts toluene are mixed at room temperature. This mixture is heated at about 150° C. for five hours. Subsequently, this reaction mixture is stripped at 150° C. and 20 mm. (Hg) pressure. The resulting product is adjusted to an oil content of about 47% producing an oil-solution of the desired acylated amine dispersant. The oil solution is characterized by a nitrogen content of 1.51% and a sulfur content of 0.96%. It can be employed in crankcase lubricating oils as a sludge dispersant in concentrations of about 0.01% to about 20% by weight although it will normally be used in amounts of about 0.1% to about 5%.

As will be apparent to those skilled in the art, additional inert organic liquid diluents can be used in the foregoing reactions to facilitate mixing and filtering in those cases where the reactants or the products are so viscous as to make handling and filtering difficult. While the foregoing examples illustrate the preferred embodiment of the invention, that is, the reaction products prepared from chlorosulfonic acid and fluorosulfonic acid, it is clear that other conventional sulfonating agents discussed hereinabove can be substituted for these halosulfonic acids in the foregoing examples on an equal molar basis using the techniques suggested by Gilbert, supra, to produce other products of the type contemplated by the present invention.

As mentioned above, the metal salts of the above reaction products are also contemplated by the present invention, particularly the Group I, Grop II, aluminum, lead, tin, cobalt, and nickel metal salts. The metal salts can be acidic salts, neutral salts, or basic salts.

As is apparent, the reaction products of this invention are characterized by the presence of an average of at least about two acidic groups per molecule, one acidic group being a carboxyl group or functional derivative thereof (i.e., anhydride, carboxylic acid halide, carboxylic acid ester) and the other being the sulfur-containing acidic group formed from the sulfonating agent. Accordingly, it is possible to prepare acidic salts of the reaction products of this invention, that is, salts in which all of the acyl groups present in the molecules of the reaction product have not combined with metal to form a metal salt. In other words, acidic salts are those metal salts which contain less metal than that amount required to neutralize all the acidic groups present according to known principles of stoichiometry. Such salts will be illustrated by the following illustrative formulae:

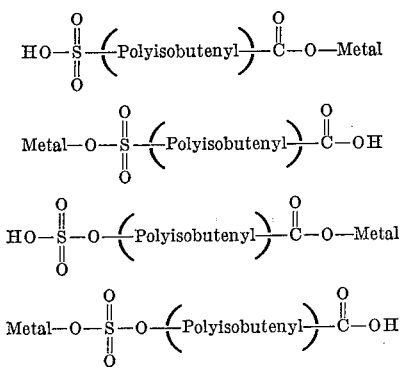

Of course, if the carboxylic acid acylating agent from which the reaction products are prepared are polycarboxylic acid acylating agents, other acidic salts are possible. For example:

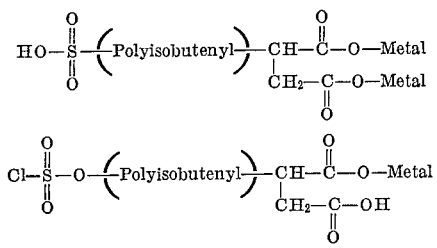

It should be understood that the foregoing formulae are merely illustrative of acidic salts and are in no way intended to be exhaustive.

A neutral salt is one in which all of the acidic acyl groups present in the reaction product have been neutralized by a metal. That is, there are no free, unreacted carboxyl groups, sulfo groups, etc., present in the reaction product. Such neutral salts are prepared by reacting a stoichiometric equivalent amount of basic reactant metal compound with the reaction products, that is, one equivalent of metal for each equivalent of carboxyl, sulfo, etc. present in the reaction mixture.

A basic salt is a salt in which the metal is present in stoichiometrically greater amounts than that required to neutralize the acid groups present. Such basic salts are characterized by a metal ratio greater than one. The term "metal ratio" as used herein is the ratio of the total equivalents of metal in the salts to the equivalents of acid therein. Thus, it is a measure of the stoichiometric excess of metal in a metal salt of the acid. For example, a basic salt can be obtained by the reaction of 1.1 to 2.0 equivalents of a basically reacting metal compound with each equivalent of acid present in the reaction product according to known procedures.

In preparing basic metal salts, it is sometimes advantageous to treat the reaction mixture, in the presence of a promoter, with carbon dioxide or other acidic material at a temperature within the range of from about 20° C. to the reflux temperature of the mixture. Carbon dioxide is usually employed although such materials as $H_2S$, HCl, $SO_2$, $SO_3$, and the like can be used. Such overbasing procedures are well-known in the prior art, see for example, U.S. Pats. 2,616,904; 2,616,905; 2,616,911; 2,616,924; 3,027,325; 3,170,880; 3,170,881; 3,312,618, and the like. The promoters which are normally used in the overbasing processes are the lower alcohols, e.g., methanol, ethanol, propanol, isopropanol, mixtures of these, etc., and phenolic compounds particularly alkyl-substituted phenols such as heptylphenol, octylphenol, nonylphenols, and the like.

For example, a basic barium salt of a reaction product of the present invention can be prepared by reacting the reaction product and barium oxide in an equivalent ratio of acid groups to barium of 1:6 and carbonating the mixture in the presence of heptylphenol. The carbonation step is not absolutely necessary in preparing all basic salts, but it is beneficial in that it allows the incorporation of significantly more metal into the oil soluble product and also has a clarifying effect on both the process mixture and the ultimate product.

The carbon dioxide treatment is conducted in such a manner as to reduce substantially the titratable basicity of the reaction mass. There are essentially two materials in the reaction mass prior to carbonation which are susceptible to reaction with carbon dioxide: the free basic metal compound (that which is in excess of the stoichiometric quantity required to form the normal metal salt) and the normal or neutral metal salt. It is possible that each of these materials reacts with the carbon dioxide simultaneously, but it is more likely that the excess basic metal compound is carbonated first and then the normal metal salt is carbonated last.

The metal salts of this invention can be prepared by mixing, at a temperature within the range of from about 20° C. to about the reflux temperature, a basically reacting metal compound and a reaction product according to the invention. In order to form the salts, the acid groups of the reaction product preferably should be in the acid form, i.e., carboxyl groups, sulfo groups, and etc. This is readily accomplished by known techniques. For example, carboxylic acid anhydrides can be converted to the corresponding acids by hydrolysis. Of course, this can be accomplished in situ. That is, a reaction product containing carboxylic acid anhydride groups can be reacted with the basically reacting metal compound in the presence of water so that the anhydride is converted to the corresponding acid in the reaction mixture.

The metal salts can also be prepared by a double decomposition reaction. That is, the reaction product can be reacted with a basic alkali metal compound and the resulting alkali metal salt can then be reacted with a metal halide to produce a given metal.

It is usually desirable to conduct the reaction in the presence of substantially inert organic diluents of the type described hereinabove with regard to preparation of the reaction products themselves. Alcohols including high molecular weight alcohols such as isooctyl alcohols also are useful diluents in the preparation of salts.

The basically reacting metal compounds suitable for preparing the salts of this invention are the usual metal reactants normally employed to prepare acid salts such as metal oxides, metal hydroxides, metal alcoholates, metal carbonates, and the like. Specific examples include the following: lithium oxide, lithium hydroxide, lithium carbonate, lithium pentylate, sodium oxide, sodium hydroxide, sodium carbonate, sodium methylate, sodium propylate, sodium phenoxide, potassium oxide, potassium hydroxide, potassium carbonate, potassium methylate, silver oxide, silver carbonate, magnesium oxide, magnesium hydroxide, magnesium carbonate, magnesium ethylate, magnesium propylate, magnesium phenoxide, calcium oxide, calcium hydroxide, calcium carbonate, calcium methylate, calcium propylate, calcium pentylate, zinc oxide, zinc hydroxide, zinc carbonate, zinc propylate, strontium oxide, strontium hydroxide, cadmium oxide, cadmium hydroxide, cadmium carbonate, cadmium ethylate, barium oxide, barium hydroxide, barium hydrate, barium carbonate, barium ethylate, barium pentylate, aluminum oxide, aluminum propylate, lead oxide, lead hydroxide, lead carbonate, tin oxide, tin butylate, cobalt oxide, cobalt hydroxide, cobalt carbonate, cobalt pentylate, nickel oxide, nickel hydroxide, and nickel carbonate. This invention is not limited to the use of these metal compounds as they are presented merely to exemplify metal compounds suitable for preparing the salts of this invention.

EXAMPLE 12

A sodium salt of the reaction product of Example 2(A) is prepared by heating 2694 parts of the reaction product to about 70° C. and thereafter adding aqueous sodium hydroxide (50 parts of sodium hydroxide dissolved in 100 parts of water) to the reaction product. This mixture is stirred and then 600 parts of toluene are added. Thereafter water is removed from the react on mixture by distillation. The resulting mixture is an oil solution of an acidic sodium salt of the reaction product of Example 2(A).

To this oil-solution there is added 129 parts of Polyamine H over a one hour period during which time the temperature of the mixture increases from 30° C. to 60° C. The resulting mixture is refluxed until 28 parts of water are removed from the reaction mass. The remaining toluene is removed by stripping the mixture to a temperature of 150° C. at a pressure of 25 mm. (Hg) and the mixture is filtered. The filtrate is an oil solution of an acylated nitrogen compound useful as a dispersant in lubricating oils. The filtrate is characterized by a sodium sulfate ash content of 0.87% and a sulfur content of 0.81%.

EXAMPLE 13

(A) A reaction mixture comprising 1110 parts of polyisobutenyl-substituted succinic anhydride (average molecular weight–1110) prepared according to the process of Example 1(A) and 1000 parts of mineral oil are heated to 35° C. Then 122 parts of chlorosulfonic acid are added over a 2.5-hour period while maintaining the temperature at 35°–45° C. The resulting mixture is then maintained at about 35° C. for two hours while blowing with nitrogen. This mixture is an oil solution of the desired reaction product and is characterized by a sulfur content of 1.26%.

(B) An additional 300 parts of mineral oil and 200 parts of water and 153 parts of calcium hydroxide are added to the thus produced oil solution and the resulting mixture is refluxed for one hour. Thereafter the reaction mass is heated to 150° C. to remove water. The resulting product is very viscous so 650 parts of mineral oil, 75 parts of isooctyl alcohol, and benzene are added to facilitate filtration. After filtration, the filtrate is stripped to a temperature of 150° C. at 20 mm. (Hg). The filtrate is an oil solution of the desired neutral calcium salt of the reaction product.

EXAMPLE 14

A reaction product is prepared according to Example 2(B) and adjusted to an oil content of 37.2%. Then, 1200 parts of this oil solution and 317 parts additional oil are mixed and heated to 60° C. Subsequently, 59 parts of lithium hydroxide monohydrate are added slowly while maintaining a temperature of 60°–70° C. Upon the completion of the addition of the lithium hydroxide monohydrate, the reaction mixture is heated at 90°–100° C. for two hours and then dried by heating at 150° C. for two hours with nitrogen blowing. The dried reaction mixture is then filtered. The filtrate has a lithium sulfate ash content of 4.88%, a sulfur content of 0.687%, and is an oil solution of the desired neutral salt.

EXAMPLE 15

Following the procedure of Example 14, 1200 parts of the oil solution of the product of Example 2(B) adjusted to an oil content of 37.2%, 413 parts of mineral oil, and 60 parts water are heated to 60° C. Thereafter, 189 parts of strontium hydroxide octahydrate are added over a one hour period and the resulting mixture is maintained at 90°–100° C. for three hours. The reaction mixture is then dried by heating to 150° C. with nitrogen blowing and filtered. The filtrate is an oil solution of the desired neutral strontium salt.

EXAMPLE 16

The procedure of Example 15 is repeated but an equivalent amount of zinc oxide is substituted for the strontium hydroxide thereby producing the corresponding zinc salt.

EXAMPLE 17

The procedure of Example 15 is followed but an equivalent amount of nickel carbonate is substituted for the strontium hydroxide thereby producing the corresponding zinc salt.

EXAMPLE 18

To a reaction mixture comprising 1500 parts of a reaction product according to Example 2(B) which has been diluted to an oil content of 50% and contains 1.3 equivalents of acid, 500 parts of toluene, 150 parts water, and 150 parts heptylphenol, there is added 650 parts of barium oxide. The mixture is slowly heated to 150° C. and maintained at this temperature under reflux while blowing with carbon dioxide until the reaction mixture is substantially neutral. Thereafter, the mixture is dried at 150° C. and filtered, the filtrate being an oil-solution of the desired basic barium salt.

EXAMPLE 19

To a mixture comprising 1500 parts of a reaction product prepared according to the procedure of Example 2(B) diluted to an oil content of 50% and containing 1.3 equivalents of acid and 500 parts of toluene there is added 175 parts of a 50% aqueous solution of sodium hydroxide. This mixture is maintained at about 100° C. for two hours in order to remove water and thereafter filtered. To the dried filtrate there is added a solution of 120 grams of calcium chloride in 170 parts water. The resulting mixture is then maintained at a temperature of 100° C. for two hours. This mixture is then dried and 240 parts of methanol and 120 parts of calcium hydroxide are added. While maintaining the temperature of this mixture at 50° C., carbon dioxide is blown therethrough until the mixture is substantially neutral. Subsequently, the reaction mixture is dried at 150° C. and filtered. The filtrate is an oil-solution of the desired basic calcium salt.

The reaction products and salts of this invention can be effectively employed in a variety of lubricating compositions based on diverse oils of lubricating viscosity such as a natural or synthetic lubricating oil, or suitable mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present additives.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene, copolymers, chlorinated polybutylenes, etc.); alkyl benzenes (e.g., dodecylbenzenes, tetradecylbenzenes, dinonylbenzenes, di-(2-ethylhexyl)benzenes, etc.); polyphenyls (e.g., biphenyls, terphenyl, etc.); and the like. Alkylene oxide polymers and interpolymers and derivatives thereof where the terminal hydroxyl groups have been modified by esterification, etherification, etc., constitute another class of known syntthetic lubrictaing oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ oxo acid diester of tetraethylene glycol. Another suitable class of synthetic lubrictaing oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra-(2-ethylhexyl)-silicate, tetra-(4-methyl - 2 - tetraethyl)-silicate, tetra-(p-tert-butylphenyl)-silicate, hexyl-(4-methyl-2-pentoxy)-disiloxane, poly(methyl)-siloxanes, poly(methylphenyl)-siloxanes, etc.). Other synthetic lubricating oils include liquid esters of phosphorus-containing aicds (e.g., tricresyl phosphate, trioctyl phosphate, diethyl ester of decane phosphonic acid, etc.), polymeric tetrahydrofurans, and the like.

The reaction products and salts of this invention can also be used as additives for normally liquid fuels such as those used in furnaces and internal combustion engines. When used as fuel additives, these materials promote cleanliness of metal parts with which they come into contact. For example, when used in internal combustion engines, the additives of this invention promote cleanliness of the fuel system including the carburetor, fuel tank, and the like. Moreover, their presence in the fuels appears to lessen the tendency of solid deposit formation in the exhaust system. In addition, the metal salts, particularly the basic metal salts of the alkaline earth metals help reduce the formation of black exhaust smoke upon combustion when incorporated in fuels for diesel engines.

Ordinarily, the reaction products and salts of this invention will be employed in the fuels in amounts such as they will comprise from about 0.001% to about 5% by weight of the total fuel composition. Preferably, the additives will be present in amounts of from about 0.01% to about 1% by weight of the total fuel composition. While the petroleum distillate fuels such as gasoline, kerosene, the various grades of diesel fuel, fuel oil, and jet fuels, are the ones most likely to be used with the additives of the present invention on a commercial scale, the less frequently used liquid fuels such as alcohols, benzene, etc. can benefit from the use of the additives of this invention.

The following examples illustrate lubricant and fuel additives of the type contemplated by the present invention.

EXAMPLE A

SAE 10W–30 mineral lubricating oil containing 5% of the reaction product of Example 2(A), 0.075% of phosphorus as zinc di-n-octylphosphorodithioate, and 5% of the barium salt of an acidic composition prepared by the reaction of 1000 parts of a polyisobutene having the molecular weight of 60,000 with 10 parts of phosphorus pentasulfide at 200° C. and hydrolyzing the product with steam at 150° C.

EXAMPLE B

SAE 10W–30 mineral lubricating oil containing 1.5% of the product of Example 2(C) and 0.05% of phosphorus as the zinc salt of a phosphorodithioic acid prepared by the reaction of phosphorus pentasulfide with a mixture of 60% (mole) of p-butylphenol and 40% (mole) of n-pentyl alcohol.

EXAMPLE C

SAE 20 mineral lubricating oil containing 2% of the product of Example 2(E).

EXAMPLE D

SAE 10 mineral lubricating oil containing 1.5% of the product of Example 1(D), 0.075% phosphorus as the adduct obtained by heating zinc di-nonylphosphorodithioate with 0.25 moles of 1,2-hexeneoxide at 120° C., a sulfurized methylester of tall oil acid having a sulfur content of 15%, 6% of a polybutene viscosity index improver having an average molecular weight of 80,000–100,000, and 0.05% of lard oil.

EXAMPLE E

Mehtyl polyisopropylene glycol ether (average molecular weight–1000) lubricating oil containing 1% of the product of Example 4.

EXAMPLE F

SAE 30 mineral lubricating oil containing 6% of the product of Example 10, 0.075% of phosphorus as the zinc salt of phosphorodithioic acid prepared by the reaction of phosphorus pentasulfide with an equi-molar mixture of n-butyl alcohol and dodecyl alcohol, and 3% of a barium detergent prepared by carbonating a mineral oil solution containing one mole of sperm oil, 0.6 mole of octylphenol, 2 moles of barium oxide, and a small amount of water at 150° C.

EXAMPLE G

SAE 20 mineral lubricating oil containing 1.5% of the product of Example 18, 0.5% of di-dodecylphosphite, 2% of a sulfurized sperm oil having a sulfur content of 9%, a basic calcium detergent prepared by carbonating a mixture comprising mineral oil, calcium mahogany sulfonate, and 6 moles of calcium hydroxide in the presence of an equi-molar mixture (10% of the mixture) of methyl alcohol and n-butyl alcohol as a promoter at the reflux temperature.

EXAMPLE H

Diesel fuel contains 0.2% of the product of Example 19.

EXAMPLE I

Gasoline containing 0.05% of the product of Example 2(A).

EXAMPLE J

Kerosene containing 0.5% of the product of Example 2(E).

As is apparent in the foregoing illustrative examples, it is contemplated that the lubricants and fuel compositions of the present invention will contain other conventional additives. Such additives include for example, detergents of the ash-containing type prepared from oil soluble sulfonic acids, viscosity index improving agents, pour point depressing agents, anti-foam agents, extreme pressure agents, rust-inhibiting agents, and other oxidation and corrosion inhibiting agents. Such additives are well-known in the art and need no detailed description herein. Examples of these materials are given in the foregoing examples and are discussed in many of the patents which have been incoroprated herein by reference.

Similarly, the fuel compositions of this invention will contain additional additives such as deicers, lead scavengers, lead appreciators, demulsifiers, lead alkyl anti-knock additives, and the like, and the like, all of which are well-known in the art.

What is claimed is:
1. A lubricant or fuel composition comprising a major amount of, respectively, a lubricating oil or a normally liquid fuel and a minor amount sufficient to impart rust-inhibiting, detergent, or, in the case of diesel fuels, black exhaust smoke-reducing properties to said composition of oil-soluble metal salts which are acidic, neutral, or basic metal salts of the oil-soluble reaction products produced by reacting under sulfonation conditions (A) at least one oil-soluble substantially saturated high molecular weight mono- or polycarboxylic acid acylating agent characterized by the presence within its structure of at least about fifty aliphatic carbon atoms exclusive of carboxyl carbon atoms and selected from the class consisting of aliphatic mono- and polycarboxylic acids, anhydrides, and halides with (B) at least one sulfonating agent, the amounts of (A) and (B) being such that there is at least about one mole of (B) for each mole of (A) and up to about one mole of (B) for each twenty-five aliphatic carbon atoms in (A), the metal cations of said salts being selected from the class consisting of aluminum, lead, tin, cobalt, nickel, Group I, and Group II metal cations said reaction being conducted at temperatures in the range of 0° C. to 200° C.

2. A composition according to claim 1 wherein (A) is produced by the process comprising reacting (1) an ethylenically unsaturated mono- or polycarboxylic acid, acid halide, or anhydride, wherein the total number of carbon atoms therein does not exceed ten, with (2) an ethylenically unsaturated hydrocarbon containing at least about fifty aliphatic carbon atoms or a chlorinated hydrocarbon containing at least about fifty aliphatic carbon atoms at a temperature within the range of about 100°–300° C.

3. A composition according to claim 2 wherein (A) is prepared by reacting an $\alpha,\beta$-ethylenically unsaturated mono- or dicarboxylic acid, or anhydride, wherein the total number of carbon atoms therein does not exceed ten, with a polyolefin or chlorinated polyolefin having an average molecular weight of about 700 to about 5,000.

4. A composition according to claim 3 wherein (B) is selected from the class consisting of chlorosulfonic acid, fluorosulfonic acid, or mixtures thereof and the sulfonation reaction temperature is in the range of about 25°–150° C.

5. A composition according to claim 4 wherein (A) is formed by reacting a polymer of 1-monolefins or a chlorinated polymer of 1-monoolefins with an $\alpha,\beta$-ethylenically unsaturated carboxylic acid or anhydride containing not more than six carbon atoms.

6. A composition according to claim 5 wherein the metal cation is selected from the group consisting of lithium, strontium, magnesium, calcium, barium, and zinc cations.

7. A composition according to claim 6 wherein the lubricating oil is a mineral lubricating oil and the normally liquid fuel is a petroleum distillate fuel.

8. A composition according to claim 7 wherein the oil-soluble metal salts are acidic salts.

9. A composition according to claim 7 wherein the oil-soluble metal salts are neutral salts.

10. A composition according to claim 7 wherein the oil-soluble salts are basic salts.

11. A lubricating composition according to claim 7.

12. A fuel composition according to claim 7.

13. A composition according to claim 7 wherein (A) is formed by reacting polyisobutene or chlorinated polyisobutene with a member selected from the class consisting of acrylic acid, methacrylic acid, maleic acid, and maleic anhydride.

14. A composition according to claim 13 wherein the metal cation is lithium.

15. A lubricating composition according to claim 13.

16. A fuel composition according to claim 13.

References Cited
UNITED STATES PATENTS

| | | | |
|---|---|---|---|
| 1,918,372 | 7/1933 | Bertsch | 252—33 |
| 1,939,169 | 12/1933 | Horwitz | 252—33 |
| 2,028,091 | 1/1936 | Jaeger | 252—33 |
| 2,616,904 | 11/1952 | Asseff et al. | 252—33 |
| 2,858,272 | 10/1958 | Cook | 252—33 |
| 2,951,809 | 9/1960 | Nelson | 252—33 |
| 3,137,713 | 6/1964 | Shen et al. | 252—33 |
| 3,320,212 | 5/1967 | Shen et al. | 252—33 |
| 3,370,005 | 2/1968 | Stein et al. | 252—33 |
| 3,408,297 | 10/1968 | Sheldahl | 252—33 |
| 3,414,517 | 12/1968 | Mosier et al. | 252—33 |

DANIEL E. WYMAN, Primary Examiner

I. VAUGHN, Assistant Examiner

U.S. Cl. X.R.

44—66, 68, 69, 70; 252—33.6, 389